3,157,668
PRODUCTION OF 5-VINYL-2-OXAZOLIDONE

Edwin D. Little, Hopewell, and Donald Pickens, Chester, Va., assignors to Allied Chemical Corporation, New York, N.Y., a corporation of New York
No Drawing. Filed Aug. 29, 1961, Ser. No. 134,575
6 Claims. (Cl. 260—307)

This invention relates to the production of a new and useful compound, 5-vinyl-2-oxazolidone.

Among the objects of the present invention are to provide the new and useful 5-vinyl-2-oxazolidone and to provide a simple and economical method for its production. Other objects will be apparent from the following detailed description.

5-vinyl-2-oxazolidone, a crystalline solid, having a melting point of about 41° to 44° C., may be represented by the following structural formula:

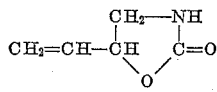

According to the present invention, 5-vinyl-2-oxazolidone is prepared by reacting cyanuric acid with 3,4-epoxy-1-butene at temperature of about 100° to 200° C. in the presence of an inert solvent for the cyanuric acid and the 3,4-epoxy-1-butene and an alkaline catalyst and in the substantial absence of oxygen, thereby forming a reaction mixture comprising 5-vinyl-2-oxazolidone, and recovering said 5-vinyl-2-oxazolidone from the reaction mixture.

The reaction involved in the process of this invention may be represented by the following equation:

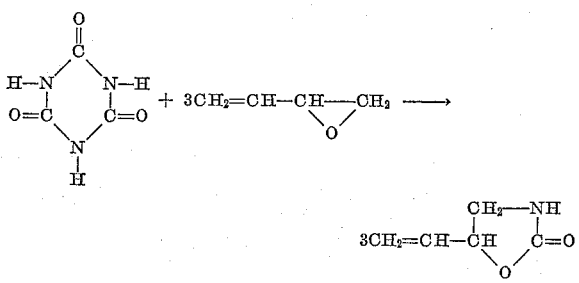

It is postulated that the above reaction proceeds via an intermediate compound, tris-(2-hydroxybuten-3-yl)isocyanurate. This intermediate compound is relatively unstable and breaks down under the elevated temperature conditions of the process to give 5-vinyl-2-oxazolidone.

The 5-vinyl-2-oxazolidone may be recovered from the reaction mixture by any suitable procedure. For example, excess inert solvent may be removed under reduced pressure and the reaction mixture then heated to temperature of about 130° to 200° C. at pressure below about 5 mm. of mercury. At such low pressure, the 5-vinyl-2-oxazolidone distills as overhead from the reaction zone and is recovered by condensation in the form of a liquid material. This material may be subsequently purified to produce the 5-vinyl-2-oxazolidone as a white crystalline solid.

The process of this invention is generally carried out using about 3 to 4 mols of 3,4-epoxy-1-butene per mol of cyanuric acid. It is preferred, however, to use about 3.0 to 3.2 mols of 3,4-epoxy-1-butene per mol of cyanuric acid in order to obtain maximum yields of desired 5-vinyl-2-oxazolidone product, i.e. upwards of about 70% of theory.

At temperature below about 100° C., the reaction between cyanuric acid and 3,4-epoxy-1-butene tends to become too slow to be practical. Moreover, at temperature above about 200° C., the product tends to decompose resulting in unacceptably low yields. Exceptionally high yields of 5-vinyl-2-oxazolidone are obtained by carrying out the reaction at temperature of about 130° to 180° C.

The reaction may be carried out over a period of about 1 to 12 hours, the required time decreasing as the reaction temperature is raised. At the preferred temperature of about 130° to 180° C., the reaction is generally completed in about 2 to 6 hours.

It is necessary in realizing the desired results of the present invention to conduct the reaction in the presence of an inert solvent for both the cyanuric acid and 3,4-epoxy-1-butene. Particularly outstanding results have been obtained using a solvent comprising a lower dialkylformamide (i.e. a dialkylformamide in which each of the alkyl radicals contains from one to four carbon atoms), preferably dimethylformamide. The solvent may be suitably employed in weight ratio of about 1 to 10 parts per part of total reactants, and preferably about 2 to 4 parts of solvent per part of total reactants.

The reaction also requires the presence of an alkaline catalyst, preferably a strongly alkaline catalyst, such as sodium hydroxide, potassium hydroxide, sodium carbonate, calcium hydroxide, tetramethyl ammonium hydroxide and tertiary aliphatic amines such as triethylamine and tripropylamine. Particularly outstanding results have been obtained upon use of alkali metal hydroxides as catalyst. The amount of catalyst can be varied as desired or as conditions may require, but ordinarily the catalyst is employed in an amount corresponding to from about 0.01 to 0.06% by weight of total reactants.

It has been found essential to exclude oxygen from the reaction mixture. Thus, if the reaction is carried out in the presence of oxygen, extremely low yields are obtained under otherwise identical operating conditions. Moreover, the presence of oxygen favors the formation of colored by-products. Exclusion of oxygen may be readily accomplished by providing a blanket of an inert gas such as nitrogen, carbon dioxide, argon, and helium over the reaction mixture. When the 3,4-epoxy-1-butene reactant has been exposed to atmospheric oxygen, it has been found desirable to subject this reactant to conventional distillation prior to use. Although we do not wish to be limited to any particular theory, it is believed that oxygen, if present, reacts with the 3,4-epoxy-1-butene to form small amounts of a reaction product which inhibits the desired reaction between the cyanuric acid and the 3,4-epoxy-1-butene.

Although the distillation of the 5-vinyl-2-oxazolidone from the reaction mixture may be effectively accomplished at pressure below about 5 mm. of mercury, the distillation is desirably effected at pressure ranging from about 0.1 to 5 mm. of mercury. As indicated above, at these low pressures the 5-vinyl-2-oxazolidone distills from the reaction zone. The distillate is then condensed to form liquid 5-vinyl-2-oxazolidone.

The pot temperature during distillation at the aforementioned pressures is normally about 130° to 200° C., which temperature is adequate to rapidly convert any intermediate compound present in the reaction mixture to the desired 5-vinyl-2-oxazolidone.

Purification of the liquid 5-vinyl-2-oxazolidone may be accomplished by conventional redistillation or by crystallizing the liquid from a suitable solvent such as ether, thereby obtaining the 5-vinyl-2-oxazolidone as a white crystalline solid.

5-vinyl-2-oxazolidone may be used as a monomer for copolymerization; however, it does not undergo homopolymerization. Thus, it is remarkably stable in storage, unlike other vinyl oxazolidones which undergo homopolymerization after storage for a few days at room temperature.

The following examples further illustrate how the present invention can be carried into effect and are given for the purpose of illustration and not limitation. In the examples, parts are by weight except where otherwise indicated.

*Example 1*

An autoclave equipped with a stirrer was charged with 13 parts cyanuric acid, 25 parts 3,4-epoxy-1-butene, 95 parts dimethylformamide and 0.5 part sodium hydroxide. The autoclave was flushed and pressured to 200 p.s.i.g. with nitrogen, and then heated to temperature of about 175° C. for a period of two hours. The reaction mixture was cooled, and the dimethylformamide was removed by vacuum distillation at pressure of about 18 to 20 mm. Hg. The residual product constituting about 35 parts was then fractionated through a two-plate column at pot temperature of about 140° to 150° C. and 0.1 mm. Hg pressure. 5-vinyl-2-oxazolidone was collected at overhead temperature of 125° to 130° C. The distilled material was condensed to form a colorless liquid constituting 24 parts of 5-vinyl-2-oxazolidone (M.P. 41–44° C. from ether). This represented a yield of 70.2% based on the cyanuric acid charged.

The supercooled liquid 5-vinyl-2-oxazolidone had an $n_D^{25}$ of 1.4842 and molecular weight of 119 (theory-113). Elemental analysis of the 5-vinyl-2-oxazolidone gave the following results:

|  | Percent Carbon | Percent Hydrogen |
|---|---|---|
| Found | 53.08 | 6.49 |
| Theory | 53.09 | 6.24 |

*Example 2*

A charge of 26 parts cyanuric acid, 190 parts dimethylformamide and 0.4 part sodium hydroxide was placed in a reaction vessel provided with a stirrer. The vessel was purged with nitrogen, maintained under a nitrogen atmosphere and then heated to temperature of about 140° C. 50 parts of 3,4-epoxy-1-butene were added to the reaction mixture over a period of 2.5 hours while the reaction temperature was maintained at about 135° to 140° C. Heating was continued for 3.5 hours at temperature of about 139° to 140° C. At the end of this period, the dimethylformamide was distilled off at reduced pressure. The residual product was distilled at pot temperature of about 160° to 165° C. and about 2.1 to 2.8 mm. Hg pressure. 5-vinyl-2-oxazolidone was collected at overhead temperature of about 146° to 150° C. The distilled 5-vinyl-2-oxazolidone was condensed to form a colorless liquid constituting 54.8 parts. This represented a yield of 80.1% based on the cyanuric acid charged. Purification of the liquid 5-vinyl-2-oxazolidone by crystallization from ether gave a solid material having a melting point of about 41° to 44° C.

The following example shows that when the process of this invention is carried out in the presence of oxygen, low product yield results.

*Example 3*

A charge of 13 parts cyanuric acid, 100 parts dimethylformamide and 0.4 part sodium hydroxide was placed in a reaction vessel open to the atmosphere. The mixture was stirred and heated to temperature of about 140° C. Twenty-five parts of 3,4-epoxy-1-butene were added to the reaction mixture over a period of 1.3 hours while the temperature was maintained at about 140° C. Heating was continued for 1.5 hours at 144–146° C. At the end of this period, the dimethylformamide was distilled off at reduced pressure. The residual product was distilled overhead at 110°–124° C. and about 0.3 to 0.6 mm. Hg pressure. The distilled 5-vinyl-2-oxazolidone was condensed to form a highly colored liquid constituting 10 parts. This represented a yield of 29.5% based on the cyanuric acid charged.

Use of 5-vinyl-2-oxazolidone as a monomer for copolymerization is illustrated in the example below.

*Example 4*

A copolymer of 5-vinyl-2-oxazolidone with methyl methacrylate is prepared by adding 0.1 part of alpha, alpha', azodi-iso-butyronitrile (as polymerization initiator) to a mixture of 5 parts of 5-vinyl-2-oxazolidone and 15 parts of methyl methacrylate. The reaction mixture is heated at temperature of 60° C. for a period of 10 minutes to give an elastic copolymer. On dilution with chloroform the copolymer can be cast as a film. The film is pliable, strong and somewhat elastic.

5-vinyl-2-oxazolidone may also be used to inhibit mold growth as illustrated in the following example.

*Example 5*

A standard nutrient solution was prepared by adding 30 grams sucrose to a Czapek solution prepared as follows:

| | |
|---|---|
| $NaNO_3$ | g— 2.0 |
| KCl | g— 0.5 |
| $MgSO_4$ | g— 0.5 |
| $FeSO_4$ | g— 0.01 |
| Potassium acid phosphate | g— 1.0 |
| $H_2O$ | ml— 1000 |
| Agar-agar | g— 20 |

A culture plate was prepared from 10 grams of the nutrient and allowed to stand in the open air for two days, then covered and allowed to stand for an additional two weeks. Several varieties of mold formed, including *Aspergillus niger*. Three fresh nutrient plates were innoculated with the *Aspergillus niger*. Two plates were untreated while the third contained 1.0 percent by weight 5-vinyl-2-oxazolidone. The plates were covered and allowed to stand at 23° to 25° C. for two weeks. At the end of this period, abundant growths of several varieties of mold were found in the untreated plates but no mold growth occurred in the plate containing the 5-vinyl-2-oxazolidone.

Since various changes and modifications may be made in this invention without departing from the spirit thereof, the invention is deemed to be limited only by the scope of the appended claims.

We claim:

1. A process for the preparation of 5-vinyl-2-oxazolidone which comprises reacting cyanuric acid with 3-4-epoxy-1-butene at temperature of about 100° to 200° C. in the presence of an inert solvent for the cyanuric acid and the 3,4-epoxy-1-butene and an alkaline catalyst and in the substantial absence of oxygen, thereby forming a reaction mixture comprising 5-vinyl-2-oxazolidone, and recovering said 5-vinyl-2-oxazolidone from the reaction mixture.

2. A process in accordance with claim 1 wherein the reaction temperature is about 130° to 180° C.

3. A process in accordance with claim 2 wherein about 3 to 4 mols of 3,4-epoxy-1-butene per mol of cyanuric acid are used.

4. A process in accordance with claim 3 wherein the inert solvent is a lower dialkylformamide.

5. A process in accordance with claim 4 wherein the alkaline catalyst is an alkali metal hydroxide.

6. A process in accordance with claim 5 wherein the 5-vinyl-2-oxazolidone is recovered by heating the reaction mixture at temperature of about 130° to 200° C. at pressure below about 5 mm. of mercury, thereby distilling the 5-vinyl-2-oxazolidone as overhead.

References Cited in the file of this patent

UNITED STATES PATENTS

| | | |
|---|---|---|
| 2,977,369 | Dixon et al. | Mar. 28, 1961 |
| 2,977,370 | Oken | Mar. 28, 1961 |
| 2,977,371 | Dixon | Mar. 28, 1961 |
| 3,020,262 | Speranza | Feb. 6, 1962 |

OTHER REFERENCES

Conant: "The Chem. of Org. Compounds" (Rev. Ed.), p. 264 (1939).

Lowy et al.: "An Introd. to Org. Chem." (Wiley & Sons, 6th Ed.), p. 213 (1945).

Jones et al.: J. Chem. Soc. (London), 1957, p. 4392–3.

Speranza et al.: J. Org. Chem., vol. 23, pp. 1922–3 (1958).

Altamura et al.: Chem. Abstracts, vol. 53, col. 20318 (1959).

Sayigh et al.: J. Chem. Soc. vol. 26, pp. 3148–9 (1961) [see USSR Patent No. 118042/59, abstracted in Chem. Abstracts, vol. 53, p. 21673 (1960)].